Patented Oct. 23, 1945

2,387,619

UNITED STATES PATENT OFFICE 2,387,619

PRODUCTION OF SYNTHETIC TANNING MATERIAL

J. Seidel, Oybin near Zittau, and Helmut Weber, Grottau, Sudetenland, Germany; vested in the Alien Property Custodian No Drawing. Application April 8, 1941, Serial No. 387,452. In Germany March 25, 1939

5 Claims. (Cl. 260—9)

This invention relates to a method for the production of synthetic tanning material and to the products of said method.

It is known to use the waste liquor of sulphite cellulose which is a by-product in the production of cellulose, as an initial material for the production of tanning material.

We have now found that tanning materials of very desirable properties can be obtained by adding to the waste liquor such a quantity of acid as is required for converting the ligninesulphonic calcium contained in the waste liquor, and condensing the waste liquor together with organic compounds, containing certain atoms or atom groups which have a close affinity to the protein of the skin, using aldehydes or ketones as condensing agents.

Advantageously an organic or inorganic acid is added to the waste liquor which furnishes soluble calcium compounds, such as, formic acid, lactic acid, glycol acid, hydrochloric acid. This offers the advantage that the condensation is accelerated and leather of lighter colour can be obtained.

Suitable atoms or atom groups adapted to produce tanning material together with the lignine matter of the waste liquor, are stated hereunder, viz:

1. —OH groups in aromatic and aliphatic compounds,
2. —SH groups in aromatic and aliphatic compounds,
3. =O groups in aromatic compounds.
4. —NH₂ groups in aromatic and aliphatic compounds,
5. =CO groups in aromatic and aliphatic compounds.

Representative of substances containing such atom groups are: Mono- and polyvalent phenols, cresols, and their derivatives, naphtols, oxy-pyridines, thiophenols, thionaphtols, quinones, urea and thiourea, as well as derivatives of said groups.

Moreover, it has been found that carbohydrates, for instance, starch and the decomposition products thereof, such as, swelling starch, soluble starch and dextrine or mixtures of these decomposition products in connection with the above mentioned substances containing the specified atom groups are excellent constituents.

According to a known method solutions containing ligninesulphonic acid with aromatic hydroxy-compounds are condensed by means of aldehydes in a strongly acid agent. The condensate, which is separated from the reaction mixture in a solid form, cannot be used as a tanning material in this form, but has to be freed from the acid and adjusted to a suitable pH-value.

According to the present invention, on the other hand, the waste liquor is condensed after the required amount of acid has been added. After the condensation no further treatment such as acidification or alkalisation is required, but the condensate can be drawn off and used as a tanning material in the form in which it is obtained in the reaction mixture. The condensate are liquid products which are readily soluble in cold water.

A wide range of different effects can be produced regarding the resulting leather by the use of several condensable constituents of the above specified types which may be added successively in a suitable temporal order. Any kind of leather ranging from stiff sole leather to the thinnest upper leather can be made by means of the tanning materials produced after our novel process.

The tanning materials produced in this manner can be mixed with any natural and with any known synthetic tanning materials in any desired proportion. Moreover, they may be used with admixtures of inorganic salts, for example, chromium, zinc or aluminum salts.

Furthermore, we have found that a noticeable lightening of the leather can be achieved by adding to the condensate neutral or slightly acid salts of organic sulpho-acids, for instance, sulphophenate of sodium or phenol-sulphonic sodium, cresol-sulphonic sodium, or benzol-sulphonic sodium.

It will thus be understood that the waste liquor is not condensed with a condensable compound in the presence of a free organic sulpho-acid, by means of aldehyde or ketones. In the known reaction of waste liquor with organic sulpho-acids, whose condensates have to be acidulated, dark coloured products are obtained. The dark colour is attributed to an oxidation of the sugar and other substances contained in the waste liquor and tending to resinification. This property of substances containing products formed by reaction of waste liquor with organic sulpho-acids has an undesirable effect upon the colour of the leather which is avoided according to the present invention.

Example 1

100 parts of waste liquor are heated with 5 parts of formic acid to a temperature of 50 to 60° C., for a period of 30 minutes; 10 parts of resorcin and 10 parts of formaldehyde are admixed and the mixture is treated by means of a reflux cooler at 80° to 90° C. for a period of 3 hours. The resulting tanning material is fully soluble in water and produces a soft, full leather.

Example 2

100 parts of waste liquor are heated with 5 parts of lactic acid to a temperature of 50° to 60° C. for a period of 30 minutes; 10 parts of resorcin are admixed with continuous stirring. After thorough mixing 15 parts of dextrine and 10 parts of formaldehyde are admixed, and the mixture is treated at 80° to 90° C. at a reflux cooler for 4 to 5 hours. The resulting tanning material is water-soluble and the leather obtained by tanning with this material is characterized by an excellent fullness.

Example 3

100 parts of waste liquor plus 5 parts hydrochloric acid are intensively stirred, then admixing 5 parts of thiourea. The condensation by means of 10 parts formaldehyde is effected in an autoclave at a pressure corresponding to 110° to 120° C. and is finished after 2½ to 3 hours. The resulting tanning material is water-soluble and produces a stiff sole leather.

Example 4

| | Parts |
|---|---|
| Waste liquor | 100 |
| Formic acid | 5 |
| Oxypyridine | 5 |
| Formaldehyde | 10 | are brought together and treated as under Example 3.

Example 5

100 parts waste liquor and 5 parts of formic acid are intensively stirred together. 10 parts cresol are stirred up and mixed until a clear solution is obtained. The mixture is then condensed with 10 parts of formaldehyde. The resulting water-soluble tanning material gives an excellent leather.

Example 6

| | Parts |
|---|---|
| Waste liquor | 100 |
| Lactic acid | 5 |
| Thiocresol | 5 |
| Formaldehyde | 10 | are brought together and treated in the manner set forth under Example 3.

Example 7

| | Parts |
|---|---|
| Waste liquor | 100 |
| Formic acid | 5 |
| Naphtol | 5 |
| Formaldehyde | 10 | are brought together and treated in the manner set forth under Example 5.

Example 8

| | Parts |
|---|---|
| Waste liquor | 100 |
| Glycol acid | 5 |
| Urea | 5 |
| Dextrine | 10 |
| Formaldehyde | 10 | are brought together and treated in the manner set forth under Example 2.

Example 9

100 parts of waste liquor are acidulated with 5 parts of glycol acid and condensed by means of a reflux cooler with a mixture consisting of 10 parts of pyrogallol and 5 parts of formaldehyde at 90° to 100° C. The resulting tanning material is readily soluble in water and produces a leather similar to quebracho.

Example 10

100 parts waste liquor are acidulated with 5 parts of formic acid and treated as under Example 5. The resulting tanning material is mixed with cresolsulphonic sodium in a proportion of 4:1. The resulting tanning material furnishes a leather similar to that produced by quebracho tanning material, but having an almost white colour.

Example 11

100 parts of waste liquor are heated with 5 parts of formic acid for 30 minutes to 50° to 60° C. 10 parts of cresol and 8 parts of acetone are admixed with continuous stirring and the mixture is treated by means of a reflux cooler for a period of 3 hours, at 80° to 90° C. The tanning material produced in this manner is fully soluble in water.

Example 12

| | Parts |
|---|---|
| Waste liquor | 100 |
| Formic acid | 5 |
| Cresol | 5 |
| Formaldehyde | 3 |
| Acetone | 2 | are mixed together and treated as described in Example 11.

Example 13

100 parts of waste liquor are heated to 60° C. 10 parts of resorcin and 5 parts of formaldehyde are admixed with continuous stirring. The mixture is treated by means of a reflux cooler for a period of 4 hours at 80° to 90° C. The resulting tanning material is water-soluble and produces a soft leather.

The waste liquor has a strength of 30° to 40° Beaumé, advantageously of 38° Bé., and a calcium content of about 1 percent. However, waste liquors having a different calcium content, for example, up to 3 percent calcium, may also be used.

The formaldehyde referred to in the examples has commercial strength, i. e., about 30 to 40 percent.

The acids referred to in the examples are formic acid of 50 percent strength, lactic acid of 80 percent strength, glycol acid of 80 percent strength and hydrochloric acid of 36 percent strength, respectively. All proportions in the examples are by weight.

The method and product of the present invention have been described in detail with reference to specific embodiments. It is to be understood, however, that the invention is not limited by such specific reference but is broader in scope and capable of other embodiments than those specifically described.

We claim:

1. In a method of producing a synthetic, water-soluble tanning material, the steps which comprise heating 100 parts by weight of waste liquor of sulphite cellulose with 5 parts of formic acid to a temperature between 50° and 60° for a period of 30 minutes, adding 10 parts resorcin and 10 parts formaldehyde, with continuous stirring, and treating the product at 80° to 90° C. by means of a reflux cooler for a period of three hours.

2. The product of the process of claim 3.

3. In a method of producing synthetic liquid products suitable as water soluble tanning materials, the steps which comprise adding to waste liquor of sulfite cellulose, an acid which will form soluble calcium compounds therewith, the ratio of said sulfite cellulose waste liquor to acid being 20 to 1, adding a compound selected from the group consisting of phenol, cresols, naphthols, oxypyridines, thiophenols and quinones, adding a carbohydrate of the group consisting of starch and dextrin and then reacting said mixture with a compound selected from the group consisting of aldehydes and ketones.

4. In a method of producing synthetic liquid products suitable as water soluble tanning materials, the steps which comprise adding to waste liquor of sulfite cellulose, an acid which will form soluble calcium compounds therewith, the ratio of said sulfite cellulose waste liquor to acid being 20 to 1, adding a compound selected from the group consisting of phenol, cresols, naphthols, oxypyridines, thiophenols and quinones, adding starch and then reacting said mixture with a compound selected from the group consisting of aldehydes and ketones.

5. In a method of producing synthetic liquid products suitable as water soluble tanning materials, the steps which comprise adding to waste liquor of sulfite cellulose, an acid which will form soluble calcium compounds therewith, the ratio of said sulfite cellulose waste liquor to acid being 20 to 1, adding a compound selected from the group consisting of phenol, cresols, naphthols, oxypyridines, thiophenols and quinones, adding dextrin and then reacting said mixture with a compound selected from the group consisting of aldehydes and ketones.

J. SEIDEL.
HELMUT WEBER.